United States Patent
Zhu (10) Patent No.: US 9,130,469 B2
(45) Date of Patent: Sep. 8, 2015

(54) PRIMARY-SIDE FEEDBACK CONTROLLED AC/DC CONVERTER WITH AN IMPROVED ERROR AMPLIFIER

(75) Inventor: Jianpei Zhu, Guangdong (CN)

(73) Assignee: FREMONT MICRO DEVICES (SZ) LIMITED, Shenzhen (CN)

( * ) Notice: Subject to any disclaimer, the term of this patent is extended or adjusted under 35 U.S.C. 154(b) by 417 days.

(21) Appl. No.: 13/610,011

(22) Filed: Sep. 11, 2012

(65) Prior Publication Data

US 2013/0181772 A1    Jul. 18, 2013

(30) Foreign Application Priority Data

Jan. 17, 2012  (CN) .......................... 2012 1 0014066

(51) Int. Cl.
*H02M 3/335* (2006.01)
(52) U.S. Cl.
CPC ................................. *H02M 3/33523* (2013.01)
(58) Field of Classification Search
CPC ................................................ H02M 3/33523
USPC ............................................ 363/21.12–21.18
See application file for complete search history.

(56) References Cited

U.S. PATENT DOCUMENTS

| 8,199,531 | B2 * | 6/2012 | Grande et al. | ............. 363/21.16 |
| 8,331,112 | B2 * | 12/2012 | Huang et al. | ................ 363/21.16 |
| 2007/0170981 | A1 * | 7/2007 | Burt et al. | ......................... 330/9 |

* cited by examiner

*Primary Examiner* — Jue Zhang
(74) *Attorney, Agent, or Firm* — Locke Lord LLP; Tim Tingkang Xia, Esq.

(57) ABSTRACT

An error amplifier, a controller using the error amplifier, and a primary-side feedback controlled AC/DC converter using the controller are discussed. When the output voltage of the primary-side feedback controlled AC/DC converter according to present invention changes, the alternating current path enjoys a fast response and adjusts the output voltage quickly with a lower precision, avoiding large voltage fluctuate, then the direct current path functions slowly to reduce equivalent output error. In such a way, the output voltage precision is enhanced while the stability of the primary-side feedback controlled AC/DC converter is maintained.

15 Claims, 10 Drawing Sheets

PRIMARY-SIDE FEEDBACK CONTROLLED AC/DC CONVERTER WITH AN IMPROVED ERROR AMPLIFIER

FIELD OF THE INVENTION

The present invention relates to a switching mode power supply, and more particularly relates to an improved error amplifier, a controller using the improved error amplifier, and a primary-side feedback controlled AC/DC converter using the controller.

BACKGROUND OF THE INVENTION

With the aggressive growth of battery powered portable electronics (e.g., cell phones), primary-side feedback controlled AC/DC converter has replaced the traditional secondary-side feedback controlled AC/DC converter in switching mode power supply field with small power due to its advantages such as low cost and compact size.

Figure 1:
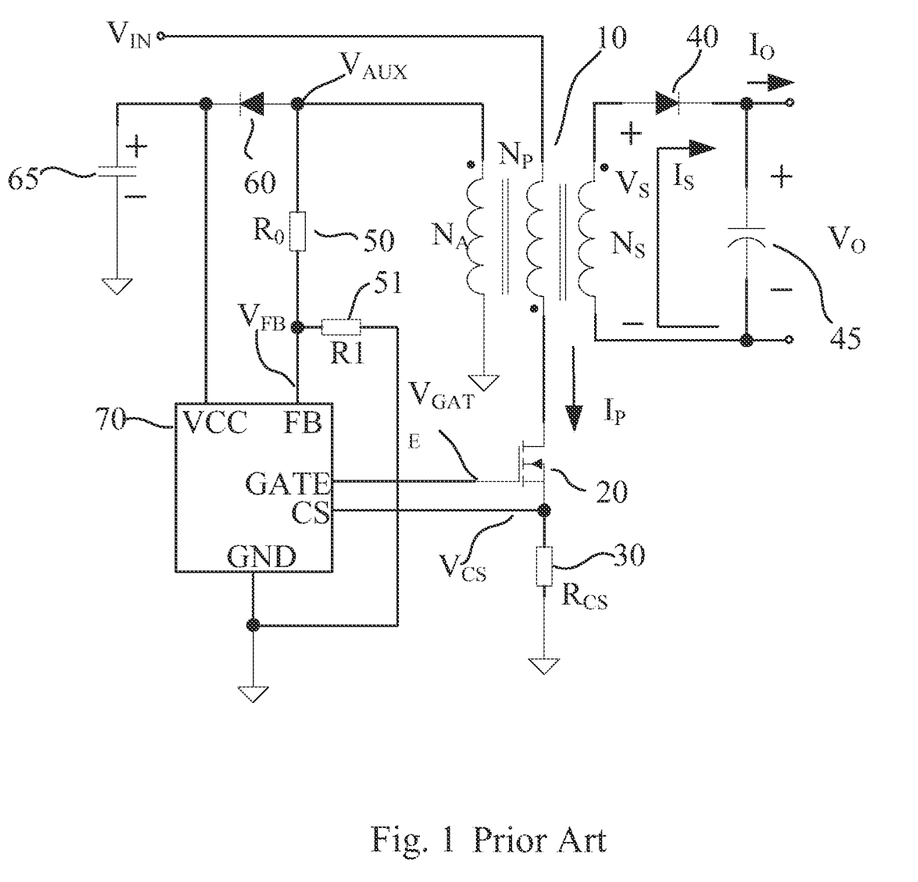
FIG. 1 illustrates a typical circuit diagram of an exemplary prior-art primary-side feedback controlled AC/DC converter.

FIG. 1 illustrates a typical circuit diagram of an exemplary prior-art primary-side feedback controlled AC/DC converter comprising a transformer 10, a primary switch 20, a secondary rectifier 40, an output capacitor 45 and a controller 70. Controller 70 supplies powers from the auxiliary winding of the transformer 10 via a rectifying diode 60. The output voltage is feed back to the controller 70 via the auxiliary winding of the transformer 10, and then sensed by voltage divider resistor R2 and R3 at FB node. A resistor 30 senses the current flowing through primary switch 20.

Figure 2:
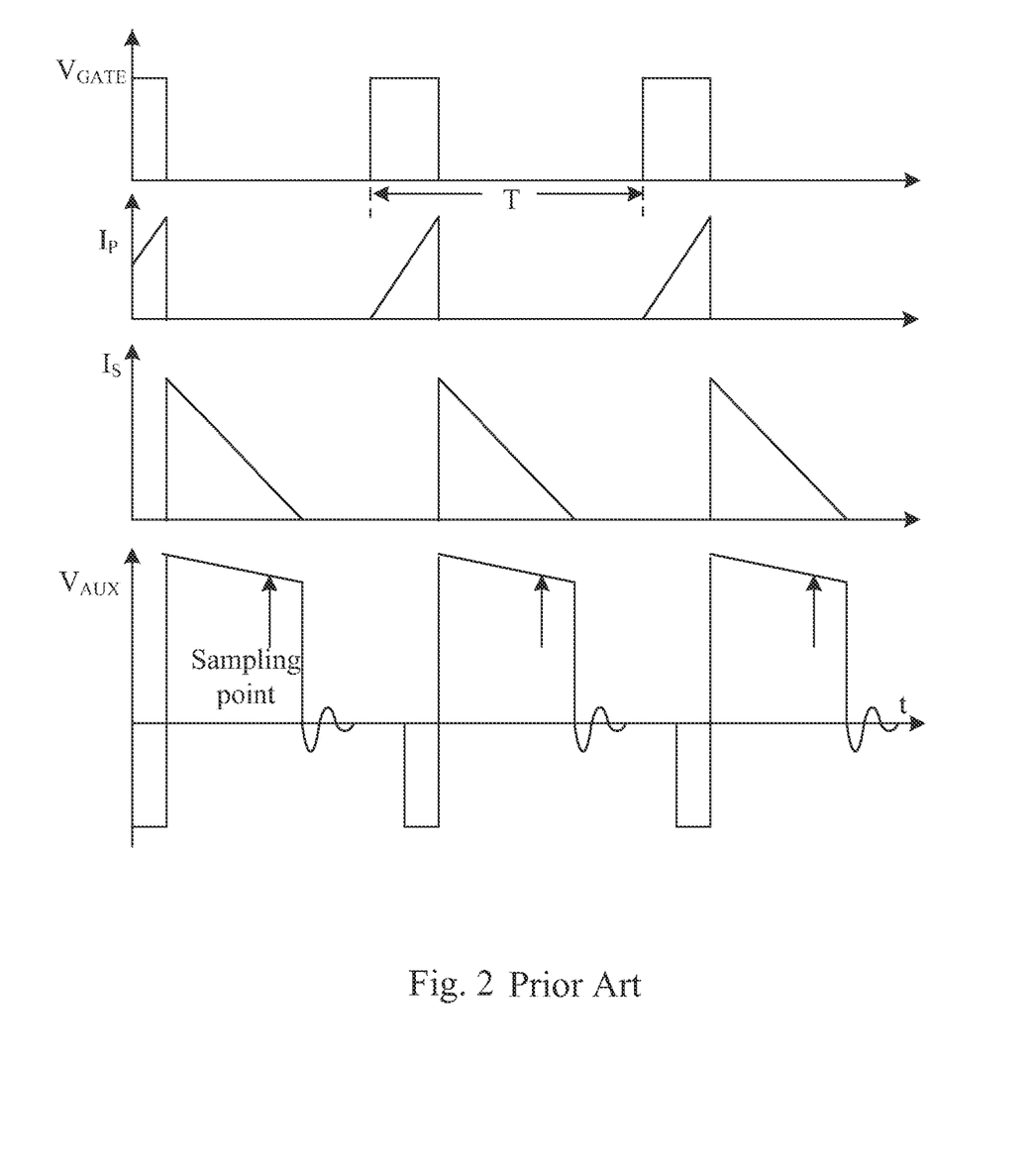
FIG. 2 illustrates the operation principle of the prior-art primary-side feedback controlled AC/DC converter shown in FIG. 1.

FIG. 2 illustrates the operation principle of the prior-art primary-side feedback controlled AC/DC converter shown in FIG. 1. At the beginning of each cycle, the controller 70 turns the primary switch 20 on. During the on time, the primary winding current $I_p$ in the inductor of the primary winding is increasing with time at a defined positive slope. While the increase of primary winding current $I_p$ enables the voltage Vcs to hit a reference value VREF1 of the comparator built in the controller 70, the primary switch 20 will be turned off and then a secondary current $I_S$ in the output winding starting with a certain peak value is decreasing until reaching zero. When the secondary current $I_S$ decreases to a defined value (such as one third of the peak value), the controller 70 samples the primary-side input voltage $V_{AUX}$ of the transformer 10, then the output voltage can be expressed as:

$$V_O = V_S - V_F \quad (1)$$
$$= V_{AUX} \times \frac{N_S}{N_A} - V_F$$
$$= V_{FB} \times \frac{R1 + R0}{R1} \times \frac{N_S}{N_A} - V_F$$

Wherein, $V_{FB}$ is FB node voltage of controller 70, $R_0$ and $R_1$ are voltage divider resistors at FB node. $N_S$ and $N_A$ are turns of secondary-side output winding and auxiliary winding of the transformer 10, respectively. $V_F$ is forward voltage drop on the secondary rectifier 40. Controller 70 determines the output voltage according to voltage $V_{FB}$ sampled at FB node, so as to adjust the PWM duty cycle and maintain the output voltage at a certain predefined value. Referring equation 1, we found output voltage precision is mainly determined by inner error $V_{FB}$ generated in the controller 70 and periphery circuit error comprising resistor proportion, turns radio of the transformer and forward voltage drop on the secondary rectifier. Inner error generated in the controller should be reduced as much as possible to guarantee high yield rate.

Figure 3:
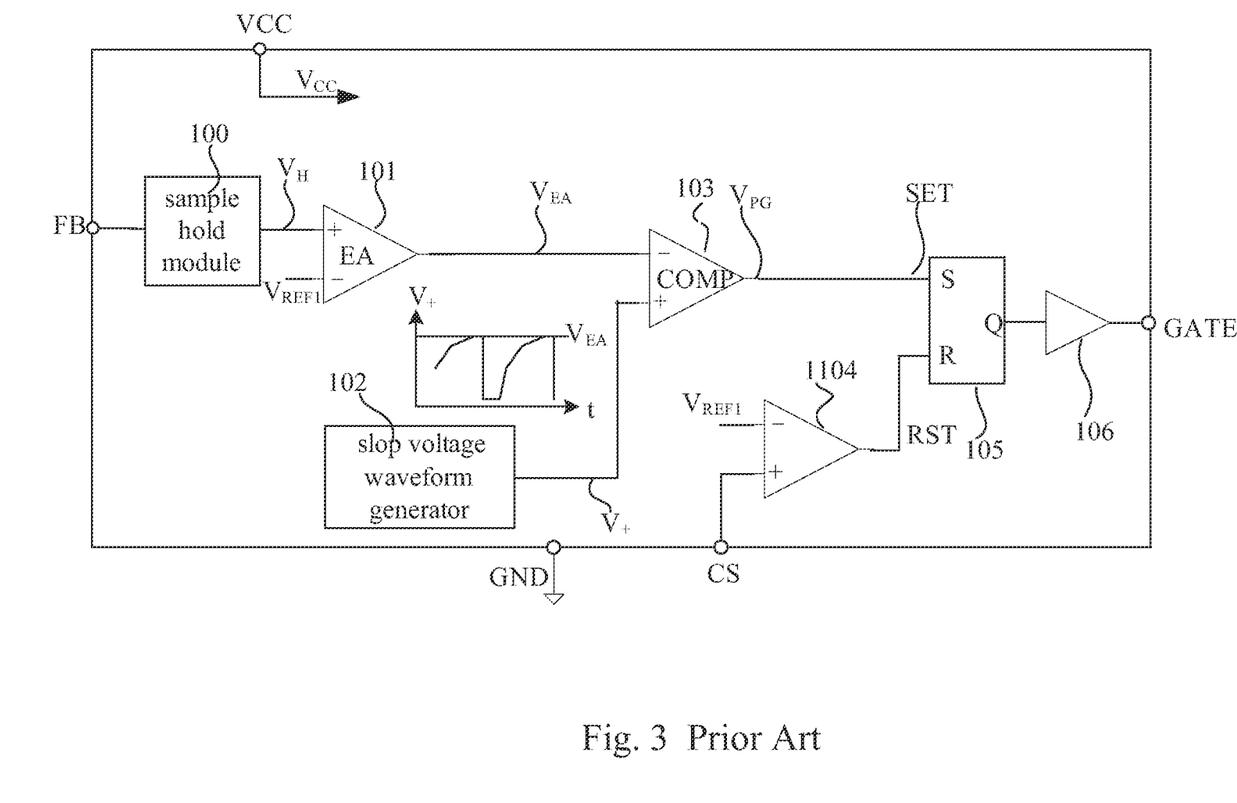
FIG. 3 illustrates the functional block diagram of the controller in the prior-art primary-side feedback controlled AC/DC converter shown in FIG. 1
Figure 4:
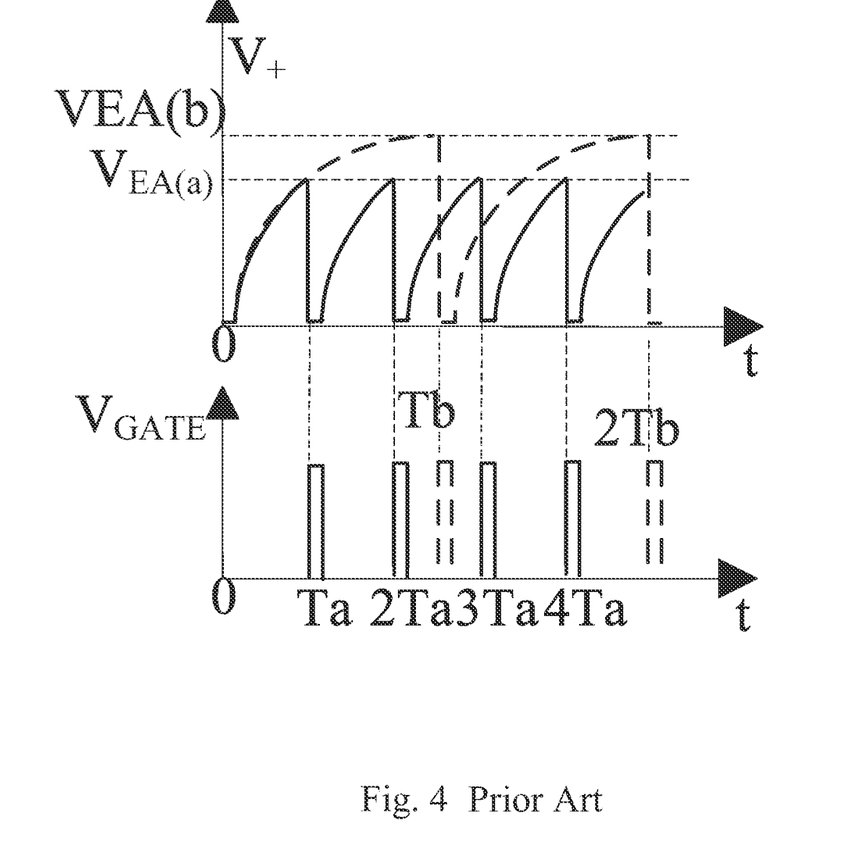
FIG. 4 illustrates the following relationship between the output voltage $V_{EA}$ of the error amplifier and the switching cycle of the primary switch of the primary-side feedback controlled AC/DC converter.

FIG. 3 illustrates the functional block diagram of the controller in the prior-art primary-side feedback controlled AC/DC converter shown in FIG. 1. The shown controller comprises a sample hold module 100, an error amplifier 101, a slop voltage waveform generator 102, a comparator 103, a peak current comparator 104, a flip-flop 105 and a driving circuit 106. FIG. 4 illustrates the following relationship between the output voltage $V_{EA}$ of the error amplifier 101 and the switching cycle of the primary switch 20 of the primary-side feedback controlled AC/DC converter:

$$T(V_{EA}) = f_T(V_{EA}) \quad (2)$$

Wherein, $f_T(\ )$ is the function determined by the stability and output precision of the primary-side feedback controlled AC/DC converter. As shown in FIG. 4, operation duration T is a monotone increasing function of output voltage $V_{EA}$ from the error amplifier 101, that is, the larger the output voltage $V_{EA}$ from the error amplifier 101, the longer the operation duration of the converter. Due to the switching frequency of the primary switch 20 f=1/T, the switching frequency f is a monotone decreasing function of output voltage $V_{EA}$ from the error amplifier 101, that is, the larger the output voltage $V_{EA}$ from the error amplifier 101, the smaller the switching frequency f.

Figure 5:
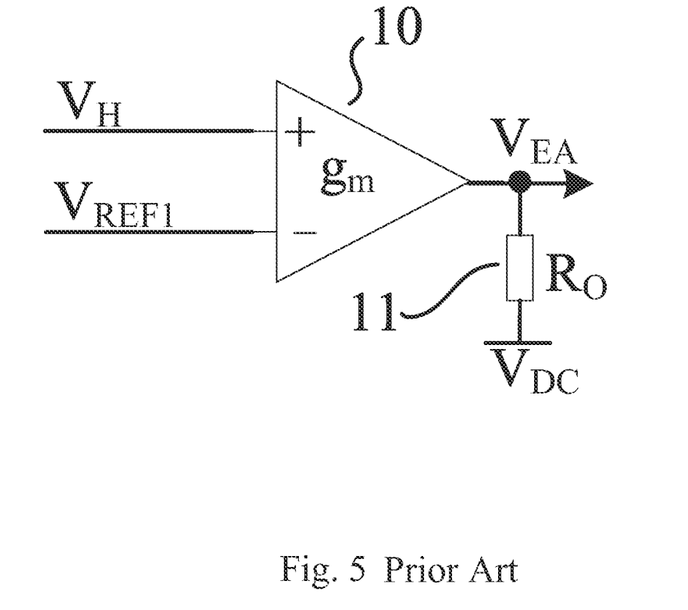
FIG. 5 illustrates the circuit diagram of the prior-art error amplifier.

FIG. 5 illustrates the circuit diagram of the prior-art error amplifier. Consisting of a transconductance amplifier 10 and a direct current resistor 11, the error amplifier has an output voltage gain as follows:

$$A = g_m \times R_O \quad (3)$$

Once the primary-side feedback controlled AC/DC converter is stable, it operates at discontinuous current mode, and output power from the transformer 10 is listed as follows:

$$P_T = \eta (\tfrac{1}{2} L_P I_P^2 f) \quad (4)$$

Wherein, $\eta$ is power transform efficiency of the primary-side feedback controlled AC/DC converter, $L_P$ is the primary inductance of the transformer 10, $I_P$ is the peak current of inductor $L_P$, f is the switching frequency. Normally, $\eta$, $I_P \cdot L_P$ all can be considered as constants.

The output power is listed as follows:

$$P_{OUT} = V_O \times I_O \quad (5)$$

Wherein, $V_O$ is output voltage, $I_O$ is output current. The output voltage $V_O$ decreases when $P_{OUT} > P_T$, increases when $P_{OUT} < P_T$ and maintains constant when $P_{OUT} = P_T$.

When the controller shown in FIG. 3 operates, sample hold module 100 obtains voltage $V_H$ from FB node. The controller operates in constant current output mode, if $V_H < V_{REF1}$, and operates in constant voltage output mode if $V_H > V_{REF1}$. Then, the output voltage of the error amplifier in FIG. 5 is listed as follows:

$$V_{EA} = A \times (V_H - V_{REF1}) + V_{DC} \quad (6)$$

Wherein, $V_{DC}$ is a fixed bias voltage, A is the voltage gain of the error amplifier. The output voltage as well as the $V_H$ and $V_{EA}$ increases when the output current decreases. The controller reduces the switching frequency, and the output power from the transformer decreases, stopping the increase of the output voltage. Similarly, the output voltage decreases when the output current increases. The controller raises the switching frequency, and the output power from the transformer increases, stopping the decrease of the output voltage. Supposing that the gain of the error amplifier is big enough, then the output voltage can be maintained at the voltage determined by following equation.

$$V_O = V_{REF1} \times \frac{R0 + R1}{R1} \times \frac{N_S}{N_A} - V_F \quad (7)$$

However, due to the stability of the controller, the voltage gain of the error amplifier in FIG. 5 is normally defined at about 40 times, and the slop voltage changes from 1V-5V at different output loads, which means the primary switch 20 enjoys a high switching frequency and $V_{EA}$ approaches 1V when outputting a rated full load current, and the primary switch 20 enjoys a low switching frequency and $V_{EA}$ approaches 5V when outputting an empty load current. As the voltage change of $V_{EA}$ is 4V, the equivalent input change is:

$$\Delta V_{REF1} = \frac{\Delta V_{EA}}{A} = \frac{4}{40} = 0.1 \text{ V} \quad (8)$$

In such a way, huge voltage error of output voltage generates between a full load and an empty load, which results in low output voltage precision of primary-side feedback controlled AC/DC converter.

SUMMARY OF THE INVENTION

The primary objective of the present invention is to provide an improved error amplifier capable of enhancing output voltage precision which maintaining the stability of the primary-side feedback controlled AC/DC converter, aiming at the technical problem of the prior art primary-side feedback controlled AC/DC converter caused by the existing error amplifier, such as poor stability and low output voltage precision.

The secondary objective of the present invention is to provide a controller provided with the improved error amplifier.

The third objective of the present invention is to provide a primary-side feedback controlled AC/DC converter using the controller provided with the improved error amplifier.

According to one aspect, the present invention relates to an error amplifier comprising a transconductance amplifier and a summing module. The transconductance amplifier receives an input sampling voltage via an in-phase input terminal, and a reference voltage via a reversed-phase input terminal. The summing module connects an output terminal of the transconductance amplifier through a direct current path via a first input terminal for receiving a direct current output of the transconductance amplifier, and connects the output terminal of the transconductance amplifier through an alternating current path via a second input terminal for receiving an alternating current output of the transconductance amplifier. An output terminal of the summing module becomes an output terminal of the error amplifier.

In one embodiment, the direct current path comprises a first gating switch and a first capacitor. Wherein, the output terminal of the transconductance amplifier may comprise a first output terminal and a second output terminal. The first gating switch is connected between the first output terminal of the transconductance amplifier and the first input terminal of the summing module. The first capacitor is connected between the first input terminal of the summing module and ground. The first gating switch receives a gating signal and turns on when the gating signal is high. In present embodiment, the alternating current path comprises a first alternating resistor connecting between the second output terminal of the transconductance amplifier and the ground. The second input terminal of the summing module connects the second output terminal of the transconductance amplifier.

In another embodiment, the direct current path comprises an inverter, a second gating switch and a second capacitor. The inverter receives a gating signal via an input terminal, and outputs the gating signal to the second gating switch connected between the output terminal of the transconductance amplifier and the first input terminal of the summing module. The second capacitor connects between the ground and the first input terminal of the summing module. The second gating switch turns on when the gating signal is low. In present embodiment, the alternating current path comprises a second alternating resistor and a third gating switch connecting between the output terminal of the transconductance amplifier and the ground. The second input terminal of the summing module connects the output terminal of the transconductance amplifier. In present embodiment, the third gating switch turns on when the gating signal is high.

In a further aspect, the present invention relates to controller provided with the improved error amplifier.

In another aspect, the present invention relates to a primary-side feedback controlled AC/DC converter using the controller provided with the improved error amplifier.

These and other aspects of the present invention will become apparent from the following description of the preferred embodiment taken in conjunction with the following drawings, although variations and modifications therein may be affected without departing from the spirit and scope of the novel concepts of the disclosure.

When the output voltage of the primary-side feedback controlled AC/DC converter according to present invention changes, the alternating current path enjoys a fast response and adjusts the output voltage quickly with a lower precision, avoiding large voltage fluctuate, then the direct current path functions slowly to reduce equivalent output error. In such a way, the output voltage precision is enhanced while the stability of the primary-side feedback controlled AC/DC converter is maintained.

BRIEF DESCRIPTION OF THE DRAWINGS

The accompanying drawings illustrate one or more embodiments of the invention and, together with the written description, serve to explain the principles of the invention, and wherein.

DETAILED DESCRIPTION OF THE PREFERRED EMBODIMENT

These and other advantage, aspect and novel features of the present invention, as well as details of an illustrated embodiment thereof, will be more fully understand from the following description and drawings. While various embodiments of the present invention has been presented by way of example only, and not limitation.

Figure 6:
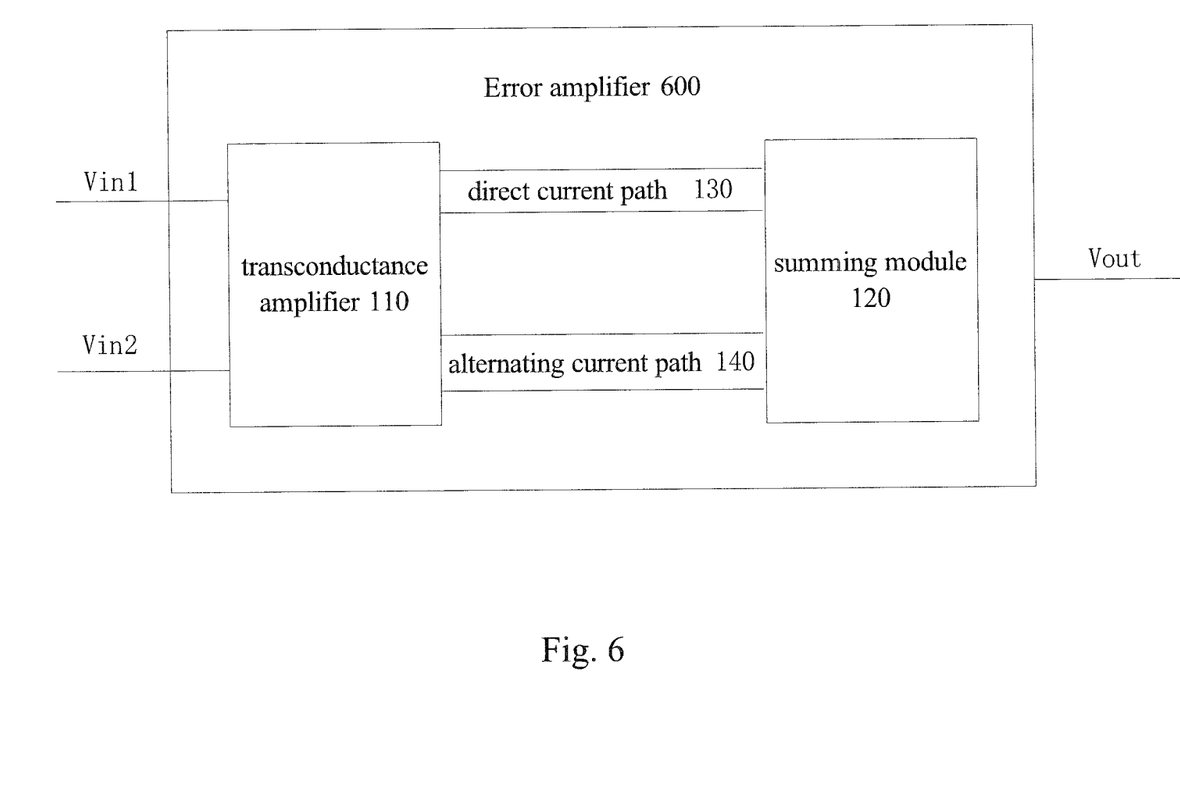
FIG. 6 illustrates the circuit diagram of the error amplifier according to a first embodiment of present invention.

FIG. 6 illustrates the circuit diagram of the error amplifier according to a first embodiment of present invention. Referring now to FIG. 6, the error amplifier 600 comprises a transconductance amplifier 110 and a summing module 120. The in-phase input terminal Vin1 of the transconductance amplifier 110 forms the in-phase input terminal of the error amplifier 600, and the reversed-phase input terminal Vin2 of the transconductance amplifier 110 forms the reversed-phase input terminal of the error amplifier 600. The transconductance amplifier 110 receives an input sampling voltage via the in-phase input terminal Vin1, and receives a reference voltage via a reversed-phase input terminal Vin2. The summing module 120 connects the output terminal Vout of the transconductance amplifier 110 through a direct current path 130 via a first input terminal for receiving a direct current output of the transconductance amplifier 110. The summing module 120 further connects the output terminal Vout of the transconductance amplifier 110 through an alternating current path 140 via a second input terminal for receiving an alternating current output of the transconductance amplifier 110. An output terminal Vout of the summing module 120 becomes the output terminal Vout of the error amplifier.

In present embodiment, the alternating current path 140 has same gain as the prior-art error amplifier, while the direct current path 130 has a gain larger than 2000. When the output voltage of the primary-side feedback controlled AC/DC converter according to present invention changes, the alternating current path 140 enjoys a fast response and adjusts the output voltage quickly with a lower precision, avoiding large voltage fluctuate, then the direct current path 130 functions slowly to reduce equivalent output error. In such a way, the output voltage precision is enhanced while the stability of the primary-side feedback controlled AC/DC converter is maintained.

One skilled in the art knows that the alternating current path 140 and direct current path 130 can be constructed in different ways only if they can obtain direct current or alternating current output from the output terminal of the transconductance amplifier.

Accordingly to the teaching of present invention, one skilled in the art can employ any element, module or structure known in present field to implement such alternating current path and direct current path. Furthermore, one skilled in the art knows that the summing module also can be realized by any know element such an analog adder or any known circuit such as an analog adding circuit.

Figure 7:
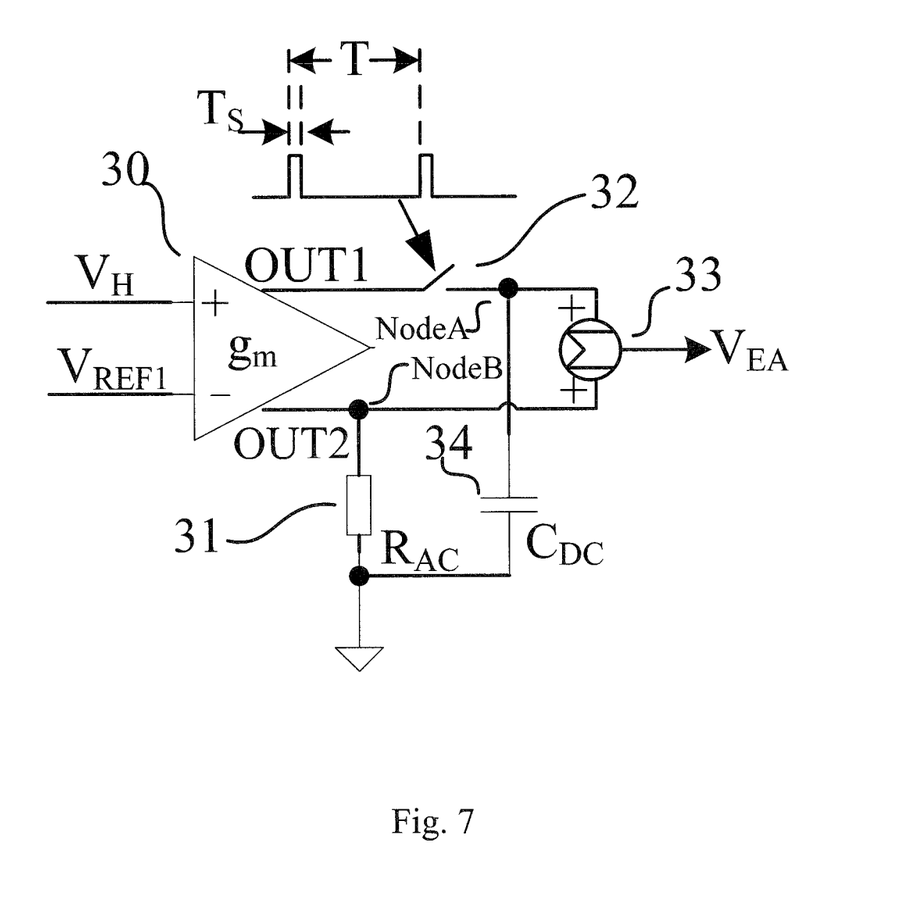
FIG. 7 illustrates the circuit diagram of the error amplifier according to a second embodiment of present invention.

FIG. 7 illustrates the circuit diagram of the error amplifier according to a second embodiment of present invention. As shown in FIG. 7, the error amplifier 600 comprises transconductance amplifier 30, analog adder 33, an alternating current path and a direct current path. The direct current path comprises gating switch 32 and capacitor 34. The alternating current path comprises alternating resistor 31. In present embodiment, the output terminal of the transconductance amplifier 30 may comprise a first output terminal OUT1 and a second output terminal OUT2. The in-phase input terminal Vin1 of the transconductance amplifier 30 forms the in-phase input terminal of the error amplifier 600, and the reversed-phase input terminal Vin2 of the transconductance amplifier 30 forms the reversed-phase input terminal of the error amplifier 600. The transconductance amplifier 30 receives an input sampling voltage $V_H$ via the in-phase input terminal Vin1, and receives a reference voltage $V_{REF1}$ via a reversed-phase input terminal Vin2. The gating switch 32 is connected between the first output terminal OUT1 of the transconductance amplifier 30 and the first input terminal of the analog adder 33. The capacitor 34 is connected between the first input terminal of the analog adder 33 and ground. The alternating resistor 31 is connected between the second output terminal OUT2 of the transconductance amplifier 30 and the ground. The second input terminal of the analog adder 33 connects the second output terminal OUT2 of the transconductance amplifier 30. The output terminal of the analog adder 33 forms the output terminal of the transconductance amplifier 30 and outputs summing results of the direct current output and the alternating current output from the direct current path and the alternating current path, that is the output voltage $V_{EA}$.

The operation principle of the error amplifier of present invention shown in FIG. 7 is discussed as follows. In present embodiment, the transconductance amplifier 30 has two independent output terminals, a first output terminal OUT1 and a second output terminal OUT2. For convince, supposing that the transconductance between the first output terminal OUT1 and the in-phase input terminal of the transconductance amplifier 30, and the transconductance between the second output terminal OUT2 and the reversed-phase input terminal of the transconductance amplifier 30 are both $g_m$, the output impedance is infinite. The gating switch 32 turns on when the gating signal is high, then current can flow into or out of capacitor 34. When gating signal is low, voltage on the capacitor 34 keeps constant. Capacitor 34 has a capacitance of $C_{DC}$, and the alternating resistor 31 has a resistance of $R_{AC}$.

The gating switch 32 turns on once in a switch duration T and maintains for a time duration of $T_s$. Then the output voltage of the error amplifier $V_{EA}$ is listed as follows $$V_{EA} = V_{NodeA} + V_{NodeB} \quad (9)$$

$V_{NodeA}$ and $V_{NodeB}$ are voltages at node A and node B, respectively. Wherein, in present switch duration T, voltage $V_{NodeA}$ at node A is $$V_{NodeA}(N) = V_{NodeA}(N-1) + \frac{(V_H - V_{REF1}) \times gm}{C_{DC}} \times T_S \quad (10)$$

Voltage $V_{NodeA}$ not only relates to the output difference of the error amplifier and but also relates to voltage at node A in the last switch duration T.

In present switch duration T, voltage $V_{NodeB}$ at node B is $$V_{NodeB} = (V_H - V_{REF1}) \times gm \times R_{AC} \quad (11)$$

Voltage $V_{NodeA}$ just relates to the output difference of the error amplifier.

Referring equation 10, when $V_H - V_{REF1} > 0$, voltage $V_{NodeA}$ increases gradually, then $V_{EA}$ will increase so as to reduce the switch frequency of the primary switch in the primary-side feedback controlled AC/DC converter and the output power from the transformer, then decrease voltage $V_H$ until $V_H - VREF_1 = 0$. At that time, the increase of voltage $V_{NodeA}$ stops. Similarly, if $V_H - V_{REF1} < 0$, voltage $V_{NodeA}$ decreases gradually so as to increase voltage $V_H$ until $V_H-V_{REF1}=0$. At that time, the decrease of voltage $V_{NodeA}$ stops. Accordingly, when the primary-side feedback controlled AC/DC converter maintains stable, that is, $V_H-V_{ref1}=0$, output voltage for adjusting the switch frequency by the error amplifier is provided by voltage $V_{nodeA}$, that is, $V_{EA}=V_{nodeA}$, $V_{nodeB}=0$. To sum up, the primary-side feedback controlled AC/DC converter may realize $V_H-V_{REF1}=0$, that is, $V_H=V_{REF}$, for any output current in stable state. Referring equation 7, we may find the output voltage never changes with the output current and then high output voltage precision is obtained.

In additional, supposing that the primary-side feedback controlled AC/DC converter output a current of $I_{O1}$ at a certain time stably, the output voltage is $V_{O1}$. Referring above discussion, we can obtain $V_H=V_{REF1}$, $V_{EA}=V_{EA1}=V_{nodeA1}$. If the output current increases to $I_{O2}$ suddenly, the output voltage decreases and results in decrease of the voltage $V_{FB}$. Voltage $V_H$ deceases from $V_{REF1}$ of last switch duration to $V_{H2}$ of present switch duration. The change of $V_H$ brings following change of $V_{nodeA}$ in present switch duration:

$$\Delta V_{NodeA} = (V_{H2} - V_{REF1}) \times gm \times \frac{T_S}{C_{DC}} \quad (12)$$

The change of $V_H$ brings following change of $V_{nodeB}$ in present switch duration:

$$\Delta V_{NodeB} = (V_{H2} - V_{REF1}) \times gm \times R_{AC} \quad (13)$$

In present invention, as $T_S/C_{DC} << R_{AC}$, $\Delta V_{nodeA} << \Delta V_{nodeB}$, the change of voltage $V_H$ brought by $V_H$ in present switch duration is $\Delta V_{EA} = \Delta V_{nodeA} + \Delta V_{nodeB} \approx \Delta V_{nodeB}$. At this time, the error amplifier of present embodiment operates similarly as that in FIG. 5, amplifying the input difference of the error amplifier for $g_m \times R_{AC}$ times rapidly. Accordingly, the output of the error amplifier decreases $\Delta V_{nodeB}$, and the switch frequency f increases to stop the decrease of the output voltage until the output power equals to $P_{OUT}$, that is, $$V_{O2} \times I_{O2} = \eta(\tfrac{1}{2} L_P I_P^2 f_2) \quad (14)$$

Then the primary-side feedback controlled AC/DC converter gets to a new balance rapidly. In this process, the increase of frequency f is mainly realized by the decrease of the alternating current output due to that the low gain characteristic of the alternating current maintains the output voltage at a voltage $V_{O2}$ lower than voltage $V_{O1}$.

As time goes by, as $V_H-V_{REF1}<0$, $V_{nodeA}$ will decreases gradually, which enable $V_H$ to increase until $V_H-V_{REF1}=0$, then maintain at $V_H=V_{REF1}$. The output voltage also increases to a predefined value. If the change of the output current is slow, voltage $V_{nodeA}$ can adapt the change of the output current, so the change of output voltage is significantly decreased.

Accordingly, when the error amplifier shown in FIG. 7 is applied to the controller of a primary-side feedback controlled AC/DC converter, it keeps the primary-side feedback controlled AC/DC converter stable rapidly while improving the load regulating rate and precision of the output voltage.

Figure 8:
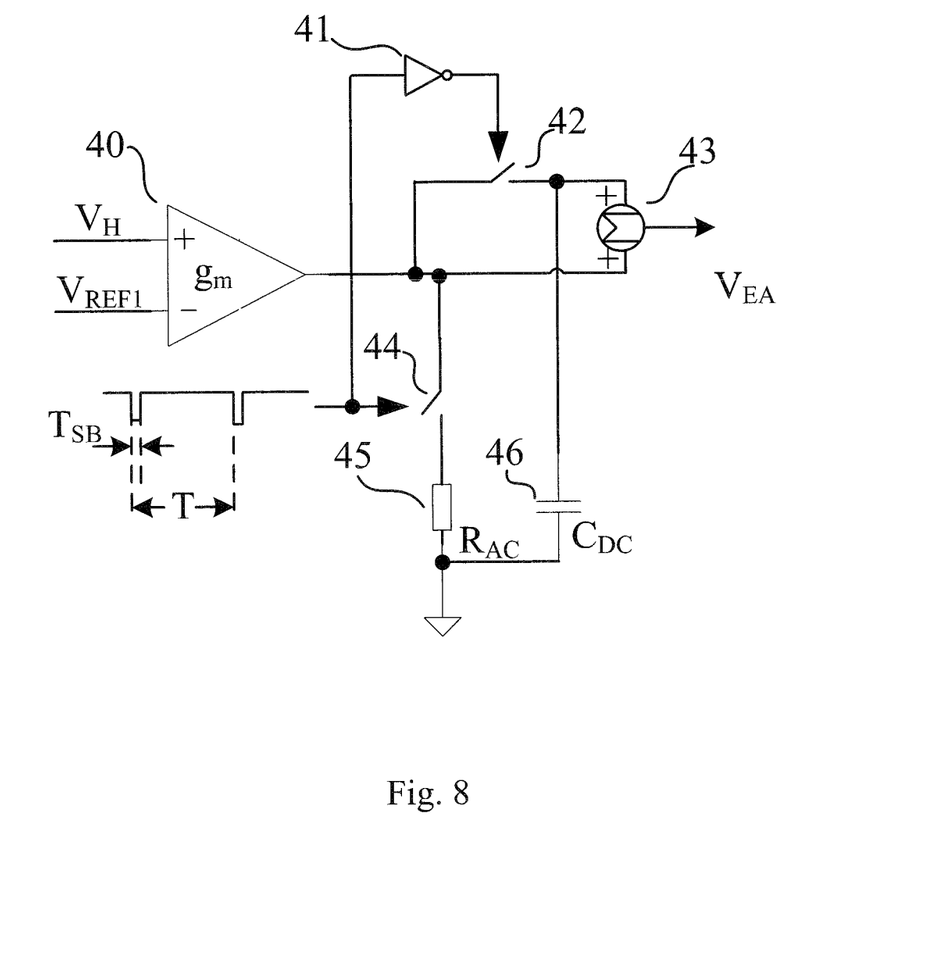
FIG. 8 illustrates the circuit diagram of the error amplifier according to a third embodiment of present invention.

FIG. 8 illustrates the circuit diagram of the error amplifier according to a third embodiment of present invention. As shown in FIG. 8, the error amplifier 600 comprises transconductance amplifier 40, analog adder 43, an alternating current path and a direct current path. The direct current path comprises inverter 41, gating switch 42 and capacitor 46. The alternating current path comprises alternating resistor 45 and gating switch 44. In present embodiment. The alternating current path comprises only one output terminal. The in-phase input terminal Vin1 of the transconductance amplifier 40 forms the in-phase input terminal of the error amplifier 600, and the reversed-phase input terminal Vin2 of the transconductance amplifier 40 forms the reversed-phase input terminal of the error amplifier 600. The transconductance amplifier 40 receives an input sampling voltage $V_H$ via the in-phase input terminal Vin1, and receives a reference voltage $V_{REF1}$ via a reversed-phase input terminal Vin2. The inverter 41 receives a gating signal via an input terminal, and outputs the gating signal to the gating switch 42 connected between the output terminal of the transconductance amplifier 40 and the first input terminal of the analog adder 43. The capacitor 46 connects between the ground and the first input terminal of the analog adder 43. The alternating resistor 45 and gating switch 44 connects between the output terminal of the transconductance amplifier 40 and the ground. The second input terminal of the analog adder 43 connects the output terminal of the transconductance amplifier 40.

In present embodiment, the gating switch 42 only turns on when the gating signal received by the output terminal of the inverter 41 is lower, and the gating switch 44 only turns on when the gating signal received is high. FIG. 8 further illustrates on time of the gating switch 42 and gating switch 44. As shown in FIG. 8, the gating switch 42 only turns on in a short time duration of $T_{SB}$ during which the gating switch 44 turns off In the other time duration of the operation duration T, the gating switch 42 turns off while the gating switch 44 turns on. The operation principle of the error amplifier of present invention shown in FIG. 8 is similar as that in FIG. 7, so not discussed for conciseness. Accordingly, when the error amplifier shown in FIG. 8 is applied to the controller of a primary-side feedback controlled AC/DC converter, it keeps the primary-side feedback controlled AC/DC converter stable rapidly while improving the load regulating rate and precision of the output voltage.

Figure 9:
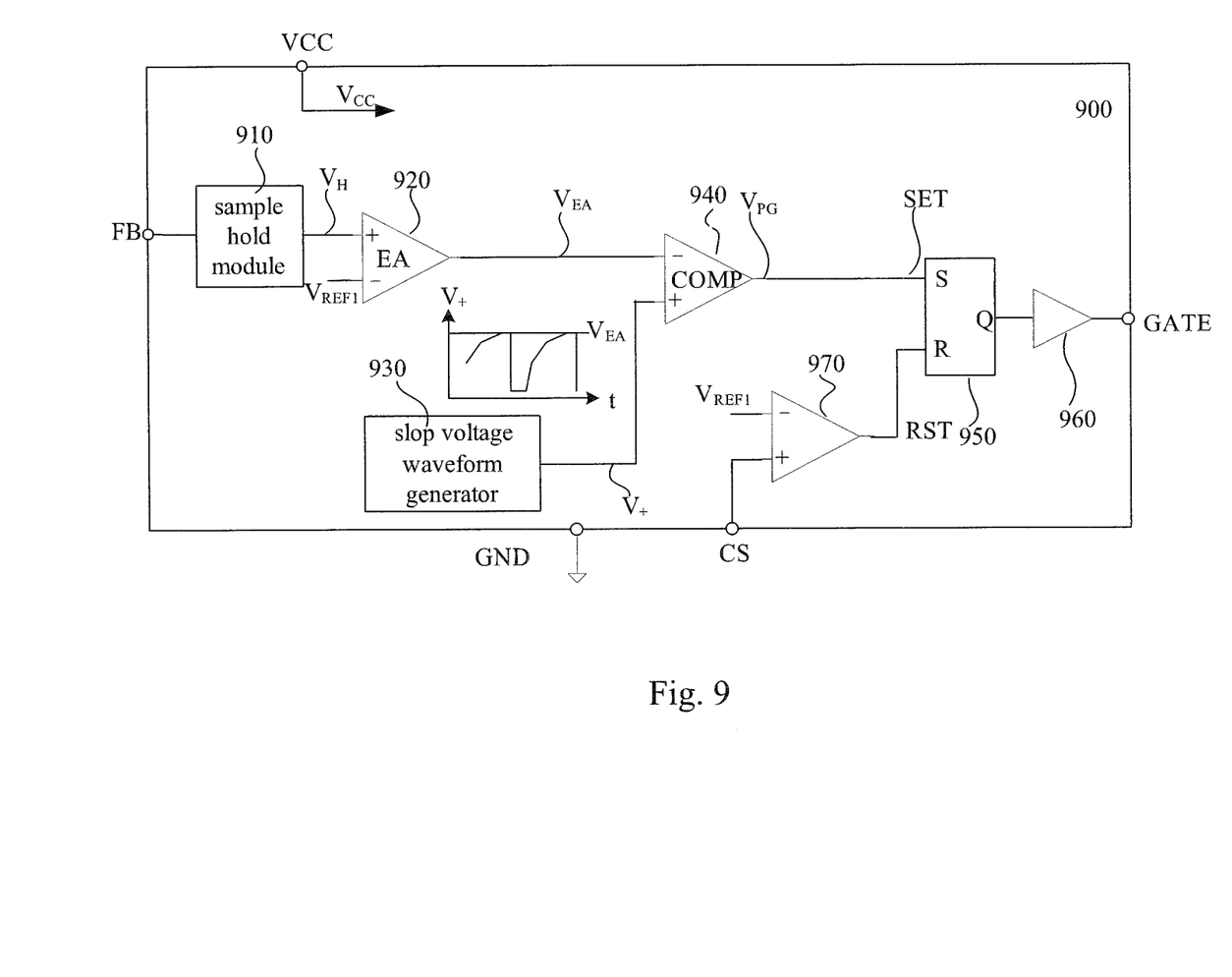
FIG. 9 illustrates the functional block diagram of the controller according to present invention.

FIG. 9 illustrates the functional block diagram of the controller according to present invention. As shown in FIG. 9, the controller 900 comprises a sample hold module 910, an error amplifier 920, a slop voltage waveform generator 930, a comparator 970, a peak current comparator 940, a flip-flop 950 and a driving circuit 960. Wherein, the error amplifier 920 can be constructed according to the error amplifier discussed in FIG. 6-8. One skilled in the art knows that the sample hold module 910, slop voltage waveform generator 930, comparator 970, peak current comparator 940, flip-flop 950 and driving circuit 960 can be constructed according to prior art. Accordingly to the disclosure of present invention, one skilled in the art can determine how to construct the controller according to present invention.

Figure 10:
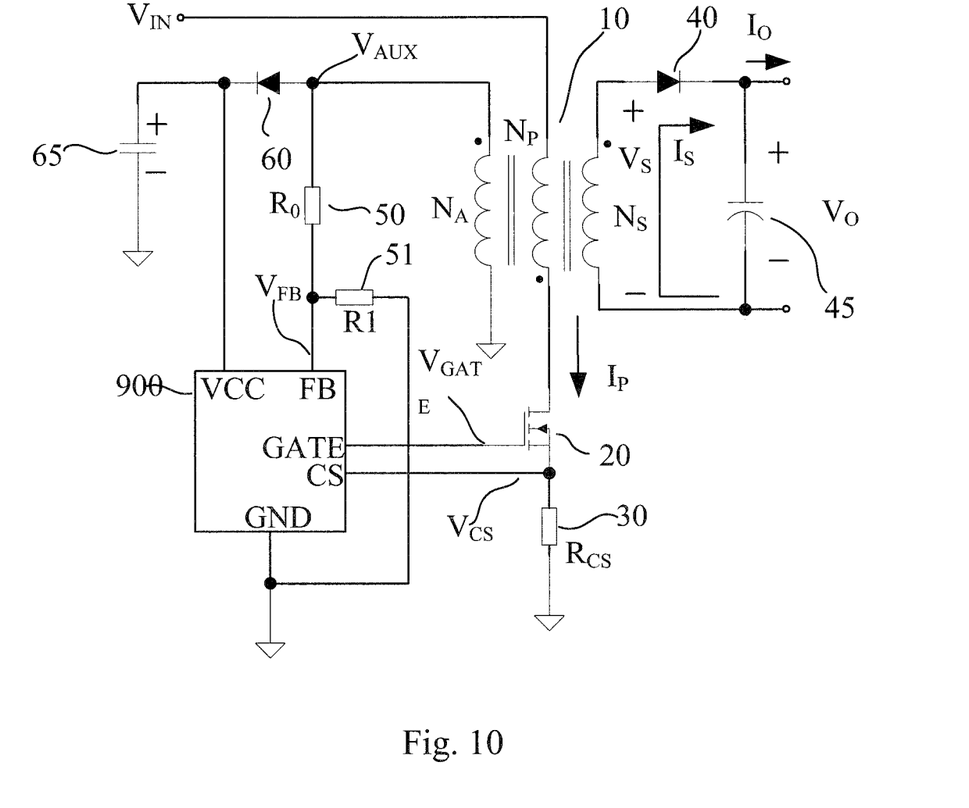
FIG. 10 illustrates a typical circuit diagram of primary-side feedback controlled AC/DC converter according to present invention.

FIG. 10 illustrates a typical circuit diagram of primary-side feedback controlled AC/DC converter according to present invention. As shown in FIG. 10, the primary-side feedback controlled AC/DC converter comprises a transformer 10, a primary switch 20, a secondary rectifier 40, an output capacitor 45 and a controller 900. Wherein, the controller 900 can be constructed according to FIG. 9. One skilled in the art knows that the transformer 10, primary switch 20, secondary rectifier 40, output capacitor 45 and other necessary components can be constructed according to prior art. Accordingly to the disclosure of present invention, one skilled in the art can determine how to construct the primary-side feedback controlled AC/DC converter according to present invention. According to present invention, when the output voltage of the primary-side feedback controlled AC/DC converter according to present invention changes, the alternating current path enjoys a fast response and adjusts the output voltage quickly with a lower precision, avoiding large voltage fluctuate, then the direct current path functions slowly to reduce equivalent output error. In such a way, the output voltage precision is enhanced while the stability of the primary-side feedback controlled AC/DC converter is maintained.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What claimed is:

1. An error amplifier comprising:
   a transconductance amplifier for receiving an input sampling voltage via an in-phase input terminal, and a reference voltage via a reversed-phase input terminal;
   a summing module connecting an output terminal of the transconductance amplifier through a direct current path via a first input terminal for receiving a direct current output of the transconductance amplifier, and connecting the output terminal of the transconductance amplifier through an alternating current path via a second input terminal for receiving an alternating current output of the transconductance amplifier;
   an output terminal of the summing module becoming an output terminal of the error amplifier;
   wherein, the direct current path comprises a first gating switch and a first capacitor, the output terminal of the transconductance amplifier comprises a first output terminal and a second output terminal, wherein, the first gating switch is connected between the first output terminal of the transconductance amplifier and the first input terminal of the summing module, and the first capacitor is connected between the first input terminal of the summing module and ground;
   wherein, the alternating current path comprises a first alternating resistor connecting between the second output terminal of the transconductance amplifier and the ground, the second input terminal of the summing module connects the second output terminal of the transconductance amplifier.

2. The error amplifier according to claim 1, wherein, the first gating switch receives a gating signal and turns on when the gating signal is high.

3. The error amplifier according to claim 1, wherein, the direct current path comprises an inverter, a second gating switch and a second capacitor, wherein, the inverter receives a gating signal via an input terminal, and outputs the gating signal to the second gating switch connected between the output terminal of the transconductance amplifier and the first input terminal of the summing module, the second capacitor connects between the ground and the first input terminal of the summing module.

4. The error amplifier according to claim 3, wherein, the second gating switch turns on when the gating signal is low.

5. The error amplifier according to claim 3, wherein, the alternating current path comprises a second alternating resistor and a third gating switch connecting between the output terminal of the transconductance amplifier and the ground, the second input terminal of the summing module connects the output terminal of the transconductance amplifier.

6. The error amplifier according to claim 5, wherein, the third gating switch turns on when the gating signal is high.

7. The error amplifier according to claim 1, wherein, the alternating current path comprises a second alternating resistor and a third gating switch connecting between the output terminal of the transconductance amplifier and the ground, the second input terminal of the summing module connects the output terminal of the transconductance amplifier.

8. The error amplifier according to claim 7, wherein, the third gating switch turns on when the gating signal is high.

9. A controller comprising a sample hold module, an error amplifier, a slop voltage waveform generator, a comparator, a peak current comparator, a flip-flop and a driving circuit,
   wherein, the error amplifier further comprising:
   a transconductance amplifier for receiving an input sampling voltage via an in-phase input terminal, and a reference voltage via a reversed-phase input terminal;
   a summing module connecting an output terminal of the transconductance amplifier through a direct current path via a first input terminal for receiving a direct current output of the transconductance amplifier, and connecting the output terminal of the transconductance amplifier through an alternating current path via a second input terminal for receiving an alternating current output of the transconductance amplifier,
   an output terminal of the summing module becoming an output terminal of the error amplifier;
   wherein, the direct current path comprises a first gating switch and a first capacitor, the output terminal of the transconductance amplifier comprises a first output terminal and a second output terminal, wherein, the first gating switch is connected between the first output terminal of the transconductance amplifier and the first input terminal of the summing module, and the first capacitor is connected between the first input terminal of the summing module and ground;
   wherein, the alternating current path comprises a first alternating resistor connecting between the second output terminal of the transconductance amplifier and the ground, the second input terminal of the summing module connects the second output terminal of the transconductance amplifier.

10. The controller according to claim 9, wherein, the first gating switch receives a gating signal and turns on when the gating signal is high.

11. The controller according to claim 9, wherein, the direct current path comprises an inverter, a second gating switch and a second capacitor, wherein, the inverter receives a gating signal via an input terminal, and outputs the gating signal to the second gating switch connected between the output terminal of the transconductance amplifier and the first input terminal of the summing module, the second capacitor connects between the ground and the first input terminal of the summing module.

12. The controller according to claim 11, wherein, the second gating switch turns on when the gating signal is low.

13. The controller according to claim 9, wherein, the alternating current path comprises a second alternating resistor and a third gating switch connecting between the output terminal of the transconductance amplifier and the ground, the second input terminal of the summing module connects the output terminal of the transconductance amplifier.

14. A primary-side feedback controlled AC/DC converter comprising a transformer, a primary switch, a secondary rectifier, an output capacitor and a controller,
   wherein, the controller comprising a sample hold module, an error amplifier, a slop voltage waveform generator, a comparator, a peak current comparator, a flip-flop and a driving circuit,
   wherein, the error amplifier further comprising:
      a transconductance amplifier for receiving an input sampling voltage via an in-phase input terminal, and a reference voltage via a reversed-phase input terminal;
      a summing module connecting an output terminal of the transconductance amplifier through a direct current path via a first input terminal for receiving a direct current output of the transconductance amplifier, and connecting the output terminal of the transconductance amplifier through an alternating current path via a second input terminal for receiving an alternating current output of the transconductance amplifier,
      an output terminal of the summing module becoming an output terminal of the error amplifier;
   wherein, the direct current path comprises a first gating switch and a first capacitor, the output terminal of the transconductance amplifier comprises a first output terminal and a second output terminal, wherein, the first gating switch is connected between the first output terminal of the transconductance amplifier and the first input terminal of the summing module, and the first capacitor is connected between the first input terminal of the summing module and ground, the alternating current path comprises a first alternating resistor connecting between the second output terminal of the transconductance amplifier and the ground, the second input terminal of the summing module connects the second output terminal of the transconductance amplifier.

15. The primary-side feedback controlled AC/DC converter according to claim 14, wherein, the direct current path comprises an inverter, a second gating switch and a second capacitor, wherein, the inverter receives a gating signal via an input terminal, and outputs the gating signal to the second gating switch connected between the output terminal of the transconductance amplifier and the first input terminal of the summing module, the second capacitor connects between the ground and the first input terminal of the summing module; the alternating current path comprises a second alternating resistor and a third gating switch connecting between the output terminal of the transconductance amplifier and the ground, the second input terminal of the summing module connects the output terminal of the transconductance amplifier.

* * * * *